(12) United States Patent
Jones

(10) Patent No.: US 10,039,292 B2
(45) Date of Patent: Aug. 7, 2018

(54) METHOD OF CUT UP LINE PRODUCT DISTRIBUTION

(71) Applicant: Baader Linco, Inc., Kansas City, KS (US)

(72) Inventor: Robert Jones, London (CA)

(73) Assignee: Baader Linco, Inc., Kansas City, KS (US)

( * ) Notice: Subject to any disclaimer, the term of this patent is extended or adjusted under 35 U.S.C. 154(b) by 0 days.

(21) Appl. No.: 15/633,491

(22) Filed: Jun. 26, 2017

(65) Prior Publication Data

US 2017/0367354 A1 Dec. 28, 2017

Related U.S. Application Data

(60) Provisional application No. 62/354,241, filed on Jun. 24, 2016.

(51) Int. Cl.
*A22C 21/00* (2006.01)

(52) U.S. Cl.
CPC ...... *A22C 21/0053* (2013.01); *A22C 21/0023* (2013.01)

(58) Field of Classification Search
CPC . A22C 21/00; A22C 21/0007; A22C 21/0023; A22C 21/0053

USPC ................. 452/177–184, 149, 150, 155, 156
See application file for complete search history.

(56) References Cited

U.S. PATENT DOCUMENTS

| | | | | |
|---|---|---|---|---|
| 6,843,169 B2* | 1/2005 | Nielsen | .............. | A22C 21/0053 452/156 |
| 6,912,434 B2 | 6/2005 | Nieuwelaar et al. | | |
| 8,328,605 B2* | 12/2012 | McMurray | ......... | A22C 21/0053 452/182 |
| 8,708,785 B2* | 4/2014 | Aandewiel | ........... | B65G 47/846 452/182 |
| 8,862,262 B2* | 10/2014 | Thorsson | ........... | A22C 17/0093 452/150 |
| 9,000,893 B2* | 4/2015 | Kwak | ................ | G06K 19/0723 209/3.2 |
| 9,538,768 B2* | 1/2017 | Dunivan | ............ | A22C 17/0086 |

* cited by examiner

*Primary Examiner* — Richard T Price, Jr.
(74) *Attorney, Agent, or Firm* — Spencer Fane LLP

(57) ABSTRACT

A poultry part harvesting, sorting, and packaging apparatus and system utilizes an arrangement of hoppers to batch poultry parts removed by cut-up machines and deposits the batches onto a transportation conveyor. Each batch is contained within a separate zone on the conveyor, and the system tracks the location of batches and open spaces on the conveyor to deliver the batches to user defined locations.

15 Claims, 10 Drawing Sheets

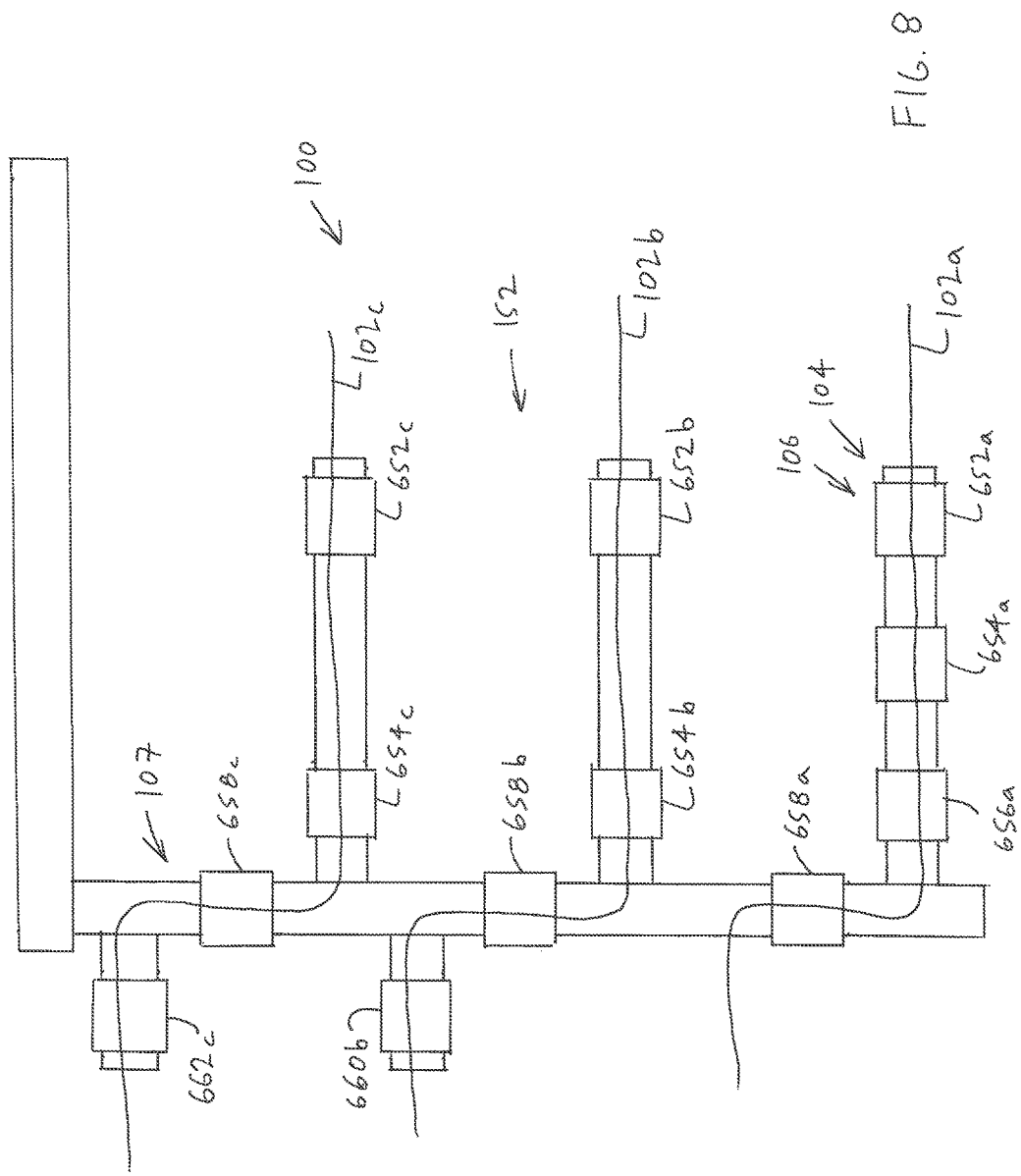

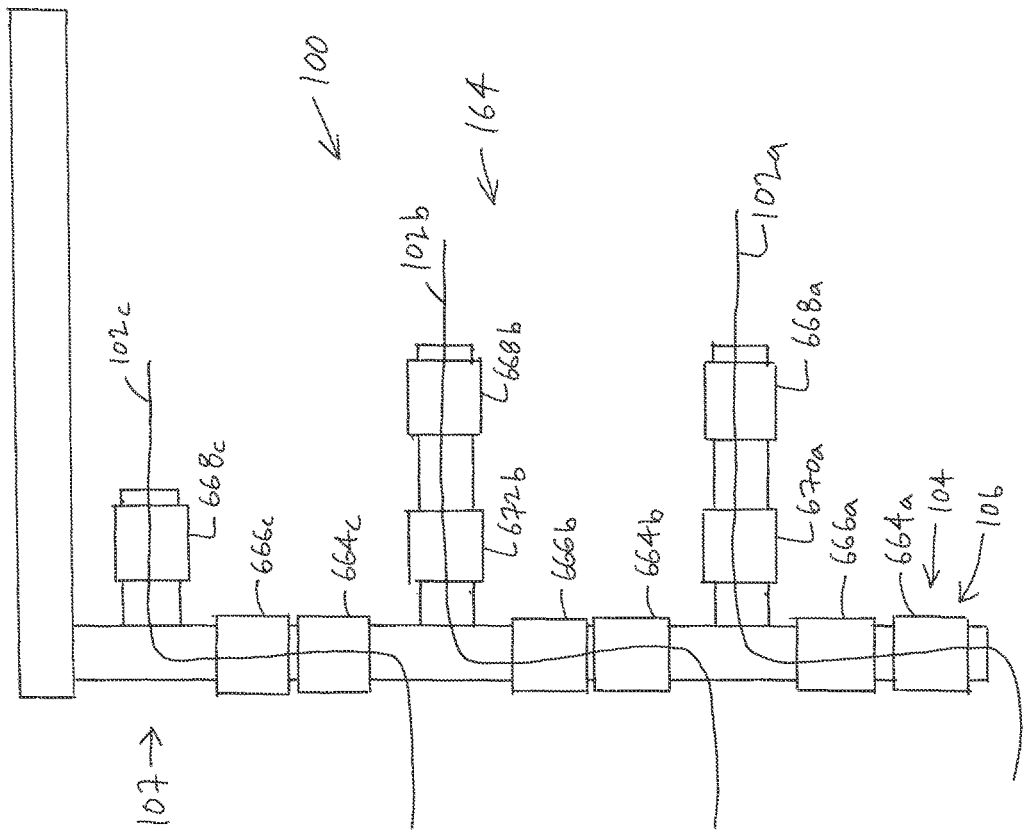

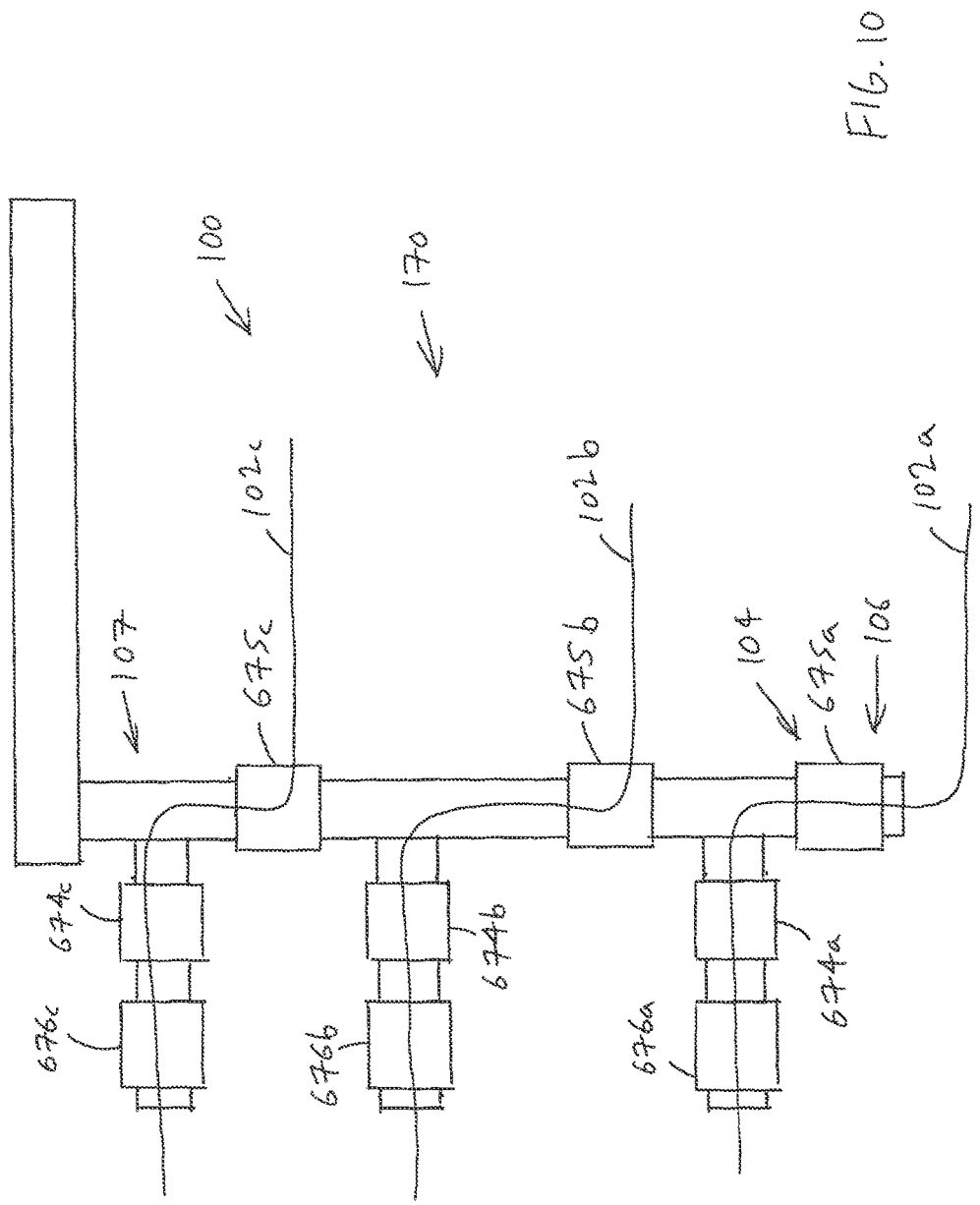

METHOD OF CUT UP LINE PRODUCT DISTRIBUTION

CROSS-REFERENCE TO RELATED APPLICATIONS

This application claims priority in of U.S. Provisional Patent Application No. 62/354,241, filed Jun. 24, 2016, the contents of which are hereby incorporated by reference.

BACKGROUND

1. Field of the Disclosed Subject Matter

The disclosed subject matter relates generally to animal processing, and more particularly to a method of distributing animal tissues harvested from animals within a processing facility.

2. Description of the Background Art

Processing animals for consumption involves sequentially harvesting parts of the animal at a processing facility. The harvested tissues are transported on multiple conveyors within the processing facility for further processing and packaging. These conveyors systems can be large, complicated and have conveyors positioned so closely together that they are difficult to access and clean.

SUMMARY

A poultry part harvesting, sorting, and packaging apparatus and method utilizes an arrangement of hoppers to batch poultry parts removed by cut-up machines and deposits the batches onto a transportation conveyor for distribution to packaging, increasing the speed of animal processing and accuracy of the packaged product.

An embodiment of the disclosed subject matter includes a poultry processing system including a first machine for removing poultry parts from a poultry carcass, a first hopper for receiving the poultry parts from the first machine, a conveyor for receiving poultry parts from the first hopper, the conveyor defining a first zone for receiving the poultry parts, and a data processing system including a processor, a first input device, and a first output device. The first input device includes a weight sensor configured to detect the weight of the poultry parts within the first hopper, and the weight sensor configured to provide weight data to the processor. The first output device configured to deposit the poultry parts onto the conveyor. The data processing system is configured to control movement of the output device and conveyor, and the system deposits the poultry parts of the first hopper within the first zone upon the weight of the poultry parts within the first hopper achieving a threshold weight.

In an aspect of the embodiment, the first zone moves relative to the first hopper, and the data processing system tracks the location of the first zone. In an aspect, the poultry processing system includes a first bulk container, and the first zone is moved to, and the poultry parts deposited in, the first bulk container. In an aspect, the poultry processing system includes a first box container, and the first zone is moved to, and the poultry parts deposited in, the first box container. In another aspect, the poultry processing system includes a bottom wall movable connected to the first hopper, and the first output device is an actuator operably connected to the bottom wall for moving the bottom wall to deposit poultry parts onto the conveyor. In an aspect of the embodiment, the poultry processing system includes an overhead conveyor for delivering the poultry carcasses to the first machine.

In an aspect, the first input device is a weight sensor configured to detect the weight of the poultry parts within the first hopper and provide weight data to the processor, and the system deposits the poultry parts of the first hopper within the first zone upon the weight of the poultry parts within the first hopper achieving a threshold weight.

In an aspect, the first input device is a count mechanism configured to count the poultry parts within the first hopper and provide count data to the processor, and the system deposits the poultry parts of the first hopper within the first zone upon the count of the poultry parts within the first hopper achieving a threshold count.

An embodiment of the disclosed subject matter includes a poultry processing method including the steps of providing a plurality of machines for removing poultry parts from a poultry carcass, providing a hopper for each machine, the hopper configured to receive the poultry parts from the machine, providing a transportation conveyor for receiving poultry parts from the hoppers, the transportation conveyor defining a plurality of zones for receiving poultry parts, and providing a data processing system comprising a processor operably connected to a plurality of input devices and a plurality of output devices. The input devices include measuring devices configured to detect the amount of the poultry parts within each of the hoppers, the measuring devices configured to provide poultry part amount data to the processor. The output devices are configured to deposit the poultry parts from the hoppers in batches onto the transportation conveyor. The data processing system is provided with poultry part amount data, is configured to control the output device and transportation conveyor, and the system deposits the poultry parts within a zone on the transportation conveyor upon the weight of the poultry parts within a hopper achieving a threshold amount.

In an aspect of the embodiment, the poultry processing method, the plurality of machines include cut-up stations, and the plurality of hoppers include a mid joints hopper, a drumettes hopper, a whole wings hopper, a boneless thighs hopper, a breast caps hopper, a split breasts hopper, a breast fillets hopper, a tenders hopper, a leg quarters hopper, an anatomical legs hopper, a spatchcock hopper, a drums hopper, and a bone in thighs hopper.

In an aspect, the poultry processing method includes providing a first distribution line, including a first conveyor system conveying poultry carcasses to a cut-up station and hopper for mid joints, drumettes, whole wings, and boneless thighs, a second conveyor system conveying poultry carcasses to a cut-up station and hopper for mid joints, drumettes, boneless thighs, and breast caps, and a third conveyor system conveying poultry carcasses to a cut-up station and hopper for drumettes, mid joints, boneless things, and split breasts. The poultry parts are deposited onto the transportation conveyor from the hoppers according to the sequence of first conveyor boneless thighs, second conveyor boneless thighs, third conveyor boneless thighs, second conveyor breast caps, third conveyor split breasts, first conveyor mid joints, first conveyor drumettes, first conveyor whole wings, first conveyor boneless thighs, second conveyor boneless thighs, third conveyor boneless thighs, second conveyor breast caps, third conveyor split breasts, second conveyor mid joints, second conveyor drumettes, first conveyer whole wings, first conveyor boneless thighs, second conveyor boneless thighs, third conveyor boneless thighs, second conveyor breast caps, third conveyor split breasts, third conveyor mid joints, and third conveyor drumettes.

In an aspect, the poultry processing method includes providing a second distribution line, including a first conveyor system conveying poultry carcasses to a cut-up station and hopper for breast fillets, tenders, leg quarters, and anatomical legs, a second conveyor system conveying poultry carcasses to a cut-up station and hopper for breast fillets, tenders, spatchcock, and leg quarters, and a third conveyor system conveying poultry carcasses to a cut-up station and hopper for breast fillets, tenders, and leg quarters. The poultry parts are deposited onto the transportation conveyor from the hoppers according to the sequence of first conveyor leg quarters, first conveyor anatomical legs, first conveyor breast fillets, second conveyor leg quarters, second conveyor spatchcock, second conveyor breast fillets, third conveyor leg quarters, third conveyor breast fillets, first conveyor tenders, first conveyor leg quarters, first conveyor anatomical legs, first conveyor breast fillets, second conveyor leg quarters, second conveyor spatchcock, second conveyor breast fillets, third conveyor leg quarters, third conveyor breast fillets, second conveyor tenders, first conveyor leg quarters, first conveyor anatomical legs, first conveyor breast fillets, second conveyor leg quarters, second conveyor spatchcock, second conveyor breast fillets, third conveyor leg quarters, third conveyor breast fillets, and second conveyor tenders.

In an aspect, the poultry processing method includes providing a third distribution line, including a first conveyor system conveying poultry carcasses to a cut-up station and hopper for first drums, second drums, and bone in thighs, a second conveyor system conveying poultry carcasses to a cut-up station and hopper for first drums, second drums, and bone in thighs, and a third conveyor system conveying poultry carcasses to a cut-up station and hopper for first drums, second drums, and bone in thighs. The poultry parts are deposited onto the transportation conveyor from the hoppers according to the sequence of first conveyor first conveyor bone in thighs, first conveyor first conveyor first drums, first conveyor second drums, second conveyor bone in thighs, second conveyor first drums, second conveyor second drums, third conveyor bone in thighs, third conveyor first drums, third conveyor bone in thighs, first conveyor bone in thighs, first conveyor first drums, first conveyor second drums, second conveyor bone in thighs, second conveyor first drums, second conveyor second drums, third conveyor bone in thighs, third conveyor first drums, third conveyor bone in thighs, first conveyor bone in thighs, first conveyor first drums, first conveyor second drums, second conveyor bone in thighs, second conveyor first drums, second conveyor second drums, third conveyor bone in thighs, third conveyor first drums, and third conveyor bone in thighs.

In an aspect of the poultry processing method the measuring device is a weight sensor configured to detect the weight of the poultry parts within each of the hoppers, and provide weight data to the processor.

In an aspect of the poultry processing method the measuring device is a count mechanism configured to count the poultry parts within each of the hoppers, and provide count data to the processor.

BRIEF DESCRIPTION OF THE DRAWINGS

The present disclosed subject matter is described herein with reference to the following drawing figures, with greater emphasis place on clarity rather than scale:

FIG. 8 is a diagrammatic representation of a first distribution line.

FIG. 9 is a diagrammatic representation of a second distribution line.

FIG. 10 is a diagrammatic representation of a third distribution line.

DETAILED DESCRIPTION

The method of distributing animal tissues harvested from animals involves gathering like parts from a processing machine in bulk and depositing a batch of the parts at a specific location on a conveyor.

In an embodiment of the disclosed subject matter, poultry carcasses move through a processing system 100 and pass through a series of poultry processing machines that remove parts from the poultry carcass.

The disclosed technology includes apparatuses and methods for the processing of poultry carcasses. A broad overview of an embodiment of the disclosed processing system will be followed by a more detailed discussion of the processing system and associated apparatuses and components.

Overview of the Poultry Processing System

Figure 1:
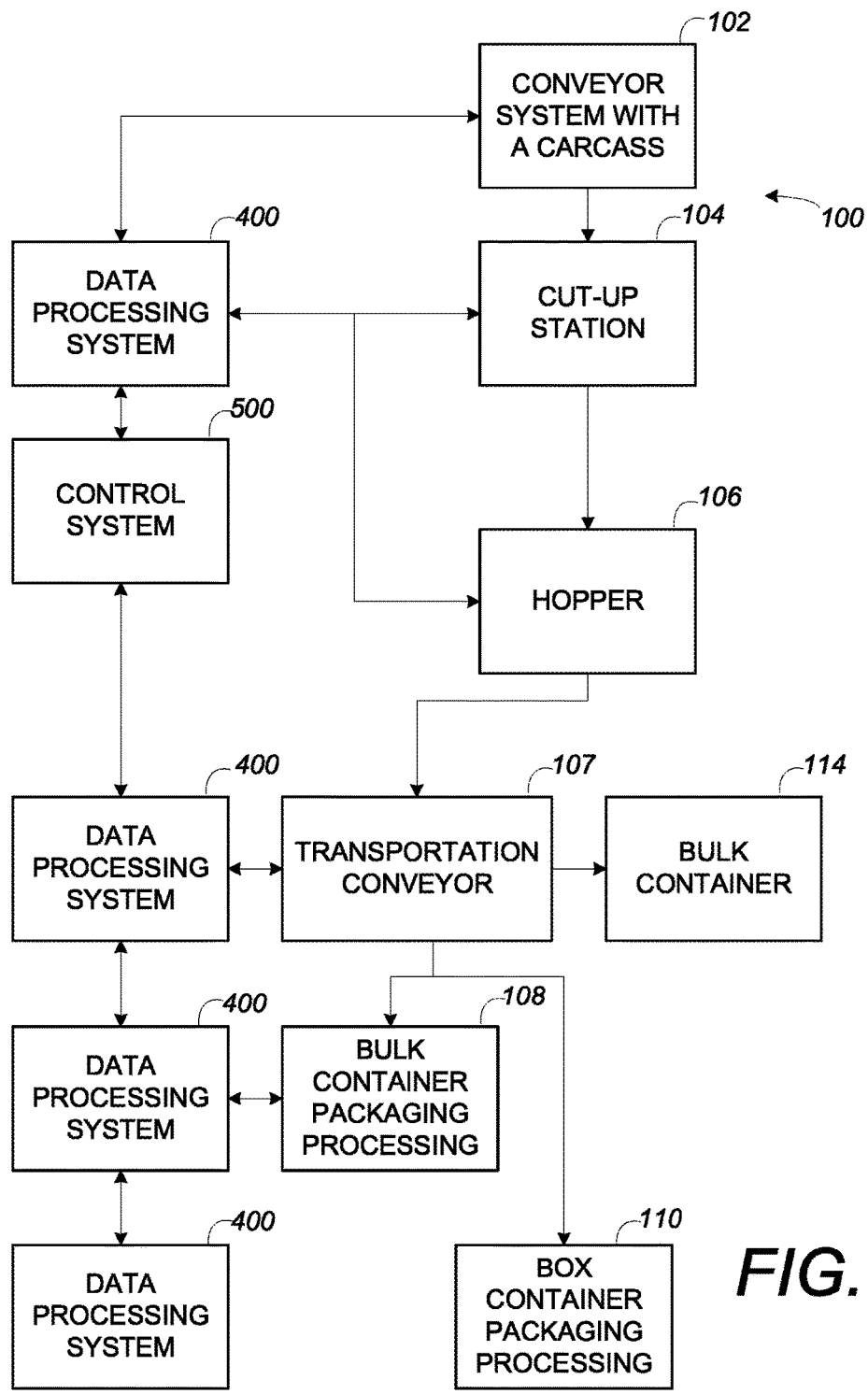
FIG. 1 is a flow diagram showing process steps performed according to an embodiment of the disclosed subject matter.

FIG. 1 is a flow diagram representing the general process steps of the poultry processing system 100. The processing system 100 includes mechanical components that interface with data processing systems 400 and a control system 500. Accordingly, the associated processing steps relate thereto. The poultry processing system 100 includes a continuous conveyor system 102 that transports poultry carcasses through one or more cut-up stations 104 where poultry parts are harvested from the carcasses. The cut-up stations 104 are arranged in a series beneath the conveyor system 102, and each cut-up station 104 includes the appropriate mechanical hardware to harvest a particular poultry part from the carcass. The harvested poultry parts include the whole wing, wing tip, mid-wing, drumettes, two-joint wing without the tip, mid-wing with the tip, front half without wings, whole leg, drumstick, boneless thigh, breast caps, split breasts, breast fillets, tenders, leg quarters, anatomical legs, spatchcock, and bone in thighs. A hopper 106 below each cut-up station 104 collects, weighs, and retains the poultry parts as a batch until the control system 500 deposits the accumulated poultry parts on the transportation conveyor 107. Once deposited on the transportation conveyor 107, the control system 500 determines what batches move to processing for bulk container packaging 108 or processing for box container packaging 110.

The processing system 100 includes one or more cut-up stations 104 and hoppers that deposit batches of poultry parts onto a transportation conveyor 107. The transportation conveyor 107 transports the batched poultry parts to bulk container packaging processing 108 or to box container packaging processing 110. The physical layout of the poultry processing facility may: limit the number of cut-up stations 104; the physical arrangement of cut-up stations 104; and the route of the conveyor system 102. Therefore, the mechanical components of the processing system 100 can be modified to accommodate the physical layout of the poultry processing facility.

Overview of the Data Processing System & Control System

Events occurring during operation of the conveyor system 102, cut-up stations 104, bulk container packaging processing 108, and box container packaging processing 110 affect the processing of the poultry parts at various steps throughout the processing system 100. The aforementioned events are detected by input devices 406 that interface with the mechanical components of the poultry processing system 100. The input devices 406 generate output data that is received by a plurality of data processing systems 400 that in turn generate output data to output devices 408 providing operative control of the aforementioned mechanical components. The control system 500 may receive input data from a plurality of data processing systems 400 located throughout the poultry processing system 100 for controlling the mechanical components of the system 100 and the overall processing of the poultry carcasses and poultry parts.

Figure 2:
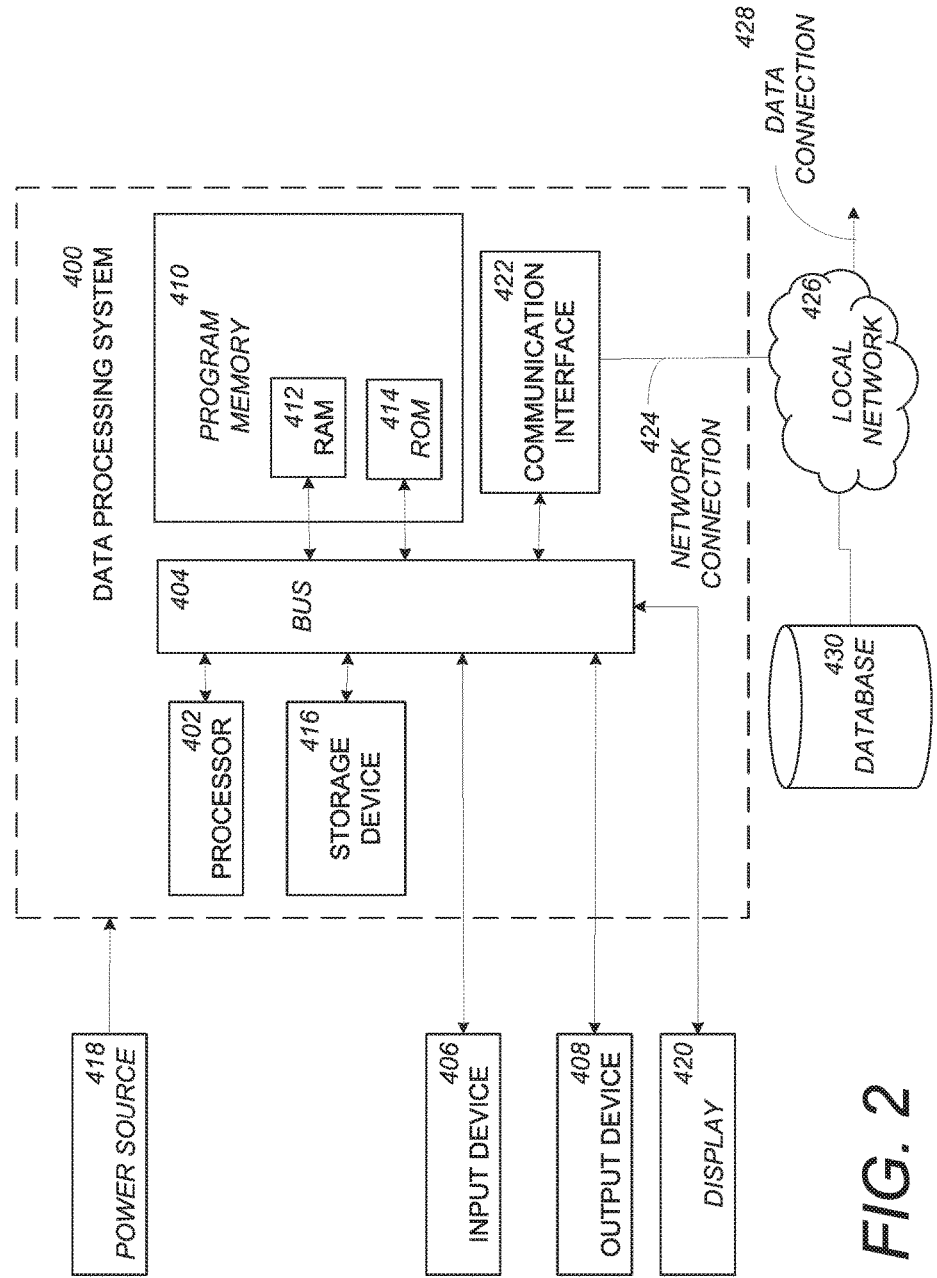
FIG. 2 is a block diagram of an embodiment of a data processing system operable with the disclosed subject matter.

FIG. 2 is a block diagram illustrating an embodiment of a data processing system 400 upon which an embodiment of the disclosed subject matter may be implemented. The system 400 may be a mobile device or a stand-alone device connected to the input devices 406 and output devices 408 throughout the system 100. The system 400 includes an enclosure that protects the interior components from physical damage.

Operation of the system 400 may be controlled by a processor 402 that executes the operating system, programs, and any other functions of the system 400 including processing data signals received from the input devices 406 and communicating data signals to output devices 408. The system 400 may include one or more databases 430 for storing or transferring data and instructions between components of the system 400.

The processor 402 may comprise a single processor or a plurality of processors such as any conventional processor device known in the art, including other processors that enable various functions of the system 400 such as graphical user interface (GUI) functions, input devices 406, and output devices 408.

Data, information, and instructions processed by the processor 402 may be stored within the program memory 410. Data includes threshold data. The threshold data includes a threshold amount, such as a threshold weight or a threshold number or count amount. Program memory 410 may include non-volatile memory such as a dynamic storage device, random-access memory (RAM) 412, read-only memory (ROM) 414, flash memory, a hard drive, or any other suitable optical, magnetic, or solid-state computer readable media, as well as a combination thereof, all of which are connected to the bus 404.

A storage device 416, including a magnetic disk, optical disk, magneto-optical disk, or non-volatile memory for storing data, information, and instructions may be connected to the bus 404.

The system 400 may be powered by a suitable power source 418 that may include one or more batteries or an AC power source, such as provided by an electrical outlet.

A user may input data, information, and/or instructions into the data processing system 400 using an input device 406 including: alphanumeric and other keys; a cursor control, such as a mouse, trackball, or cursor direction keys; and any number of input structures existing in various forms including sensors, buttons, switches, control pad, knob, wheel, or other suitable forms.

System 400 information and images are presented by a display 420. For example, the display 420 may show system 400 information and images including operational status of the distribution and packaging line, distribution and packaging lines with their products, and desired final output of poultry parts for customer orders. The display 420 may be any type of display, such as a cathode ray tube (CRT), a liquid crystal display (LCD), a light emitting diode (LED) display, an organic light emitting diode (OLED) display, or other suitable display. The display 420 may include touch-sensitive functionality, such as a touch screen. The display 420 may display a GUI that allows a user to interact with the system 400. The GUI may include various screens, layers, windows, elements, or components that may be displayed in whole or in part on all or a portion of the display 420.

In an embodiment of the disclosed subject matter, aspects of the processing system 100 are performed by a local data processing system 400 in response to the processor 402 executing one or more sequences of one or more instructions contained in the program memory 410. Such instructions may be read into the program memory 410 from another computer-readable medium, including the storage device 416. Execution of the sequences of instructions contained in the program memory 410 cause the processor 402 to perform the process steps described herein. In alternative embodiments, a plurality of data processing systems 400 may be used in combination with a control system 500 executing one or more sequences of one or more instructions.

One or more communication interfaces 422 may provide additional data channels for receiving and transmitting data, information, or instructions. The communication interface 422 may include one or more network interface hardware elements and associated communication protocols. The communication interface 422 provides two-way data communication by a network connection 424 connected to a local network 426. The communication interface 422 may include several types of interfaces, including a wireless local area network (WLAN) interface, and unstructured supplementary service data (USDD) interface, a personal area network (PAN) interface, a local area network (LAN) interface, and a wide area network (WAN) interface.

The network connection 424 also provides a data connection through one or more local networks 426 to other data devices by a data connection 428. For example, the network connection 424 may also provide a connection through a LAN 426 to other data processing systems 400 used in the poultry processing system 100, or to the control system 500. The data processing system 400 may execute one or more sequences of one or more instructions contained in one or more databases 430 connected to the local network 426.

Figure 3:
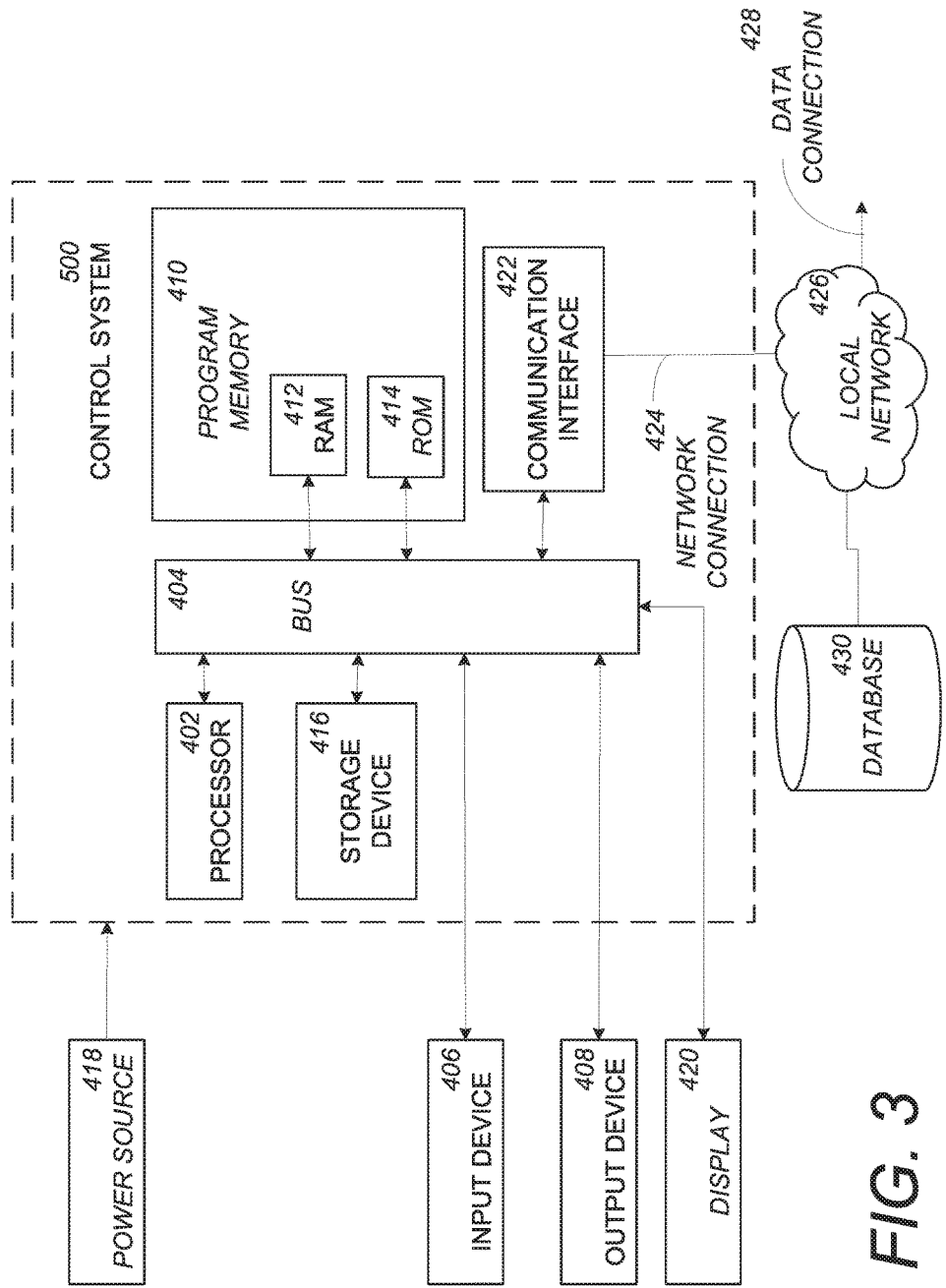
FIG. 3 is a block diagram of an embodiment of a control system operable with the disclosed subject matter.

Referring to FIG. 3, the control system 500 includes many of the same components found in the data processing system 400 serving similar functions. In addition, the control system 500 analyzes events occurring during poultry processing in the form of data from the various data processing systems 400 and adjusts operation of the processing system 100 and movement of the poultry parts through the processing system 100 to optimize the distribution of the poultry parts throughout, and to avoid a cessation of movement of poultry parts through the processing system 100.

Event data may include: mechanical problems with the bulk container packaging processing 108; mechanical problems with the box container packaging processing 110; a backup of movement of poultry parts through the bulk container packaging processing 108; a backup of movement of poultry parts through the box container packaging processing 110; and a determination by the control system 500 that carcasses or poultry parts in the processing system 100 have characteristics that dictate their processing by bulk container packaging processing 108 or box container packaging processing 110. The data processing system 400 can determine batch and product composition, configuration of each distribution and packing line, and final destination of each batch and product to fill customer orders based on the incoming batches or product (fully automated) or it could display the configuration of each distribution and packing line, incoming carcasses and product to be processed and batches and products required to fill orders and allow the user to determine each product's destination (partially automated).

Conveyor System & Poultry Part Harvesting

Poultry carcasses are delivered to the various cut-up stations 104 by an overhead conveyor system 102. A hopper 106 below each cut-up station 104 collects, weighs, and retains the poultry parts harvested by the cut-up station 104 above as a batch until a processing parameter dictates a drop of the contents of the hopper 106. A plurality of input devices 406 interface with a plurality of data processing systems 400 and a control system 500 to store and analyze event data generated by the poultry processing system 100.

Figure 4:
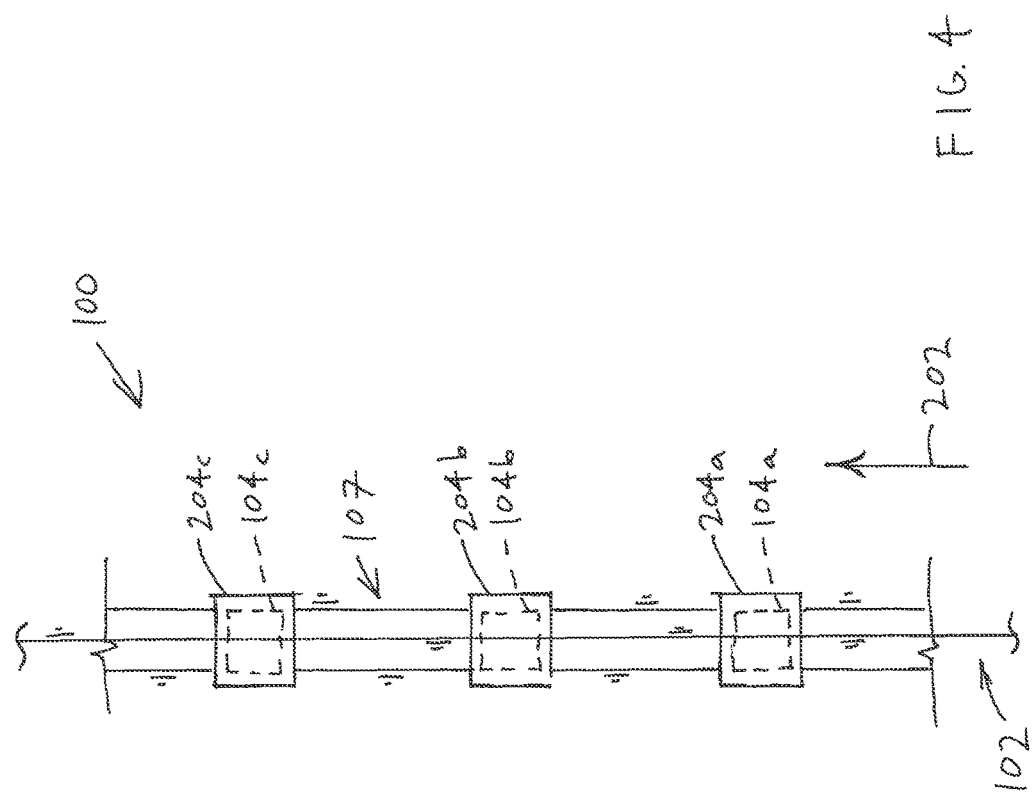
FIG. 4 is a diagram showing the conveyor system and cut-up stations embodying aspects of the disclosed subject matter.

Referring to FIG. 4, the processing system 100 is shown from above with the conveyor system 102 moving in the direction of arrow 202 over a plurality of aligned cut-up stations 104, represented by cut-up stations 204a, 204b, and 204c. Although only three cut-up stations 104 are shown, the system 100 can include additional cut-up stations 104. Each cut-up station 104 includes a mechanical processing device that removes a poultry part from the carcass, described above. The conveyor system 102 travels throughout the processing facility to guide the poultry carcasses through the cut-up stations 104 wherever they are located. In an alternative embodiment, cut-up stations 104 may be curvilinear aligned along a transportation conveyor 107 to accommodate the desired layout of the processing system 100 within a processing facility.

Figure 5:
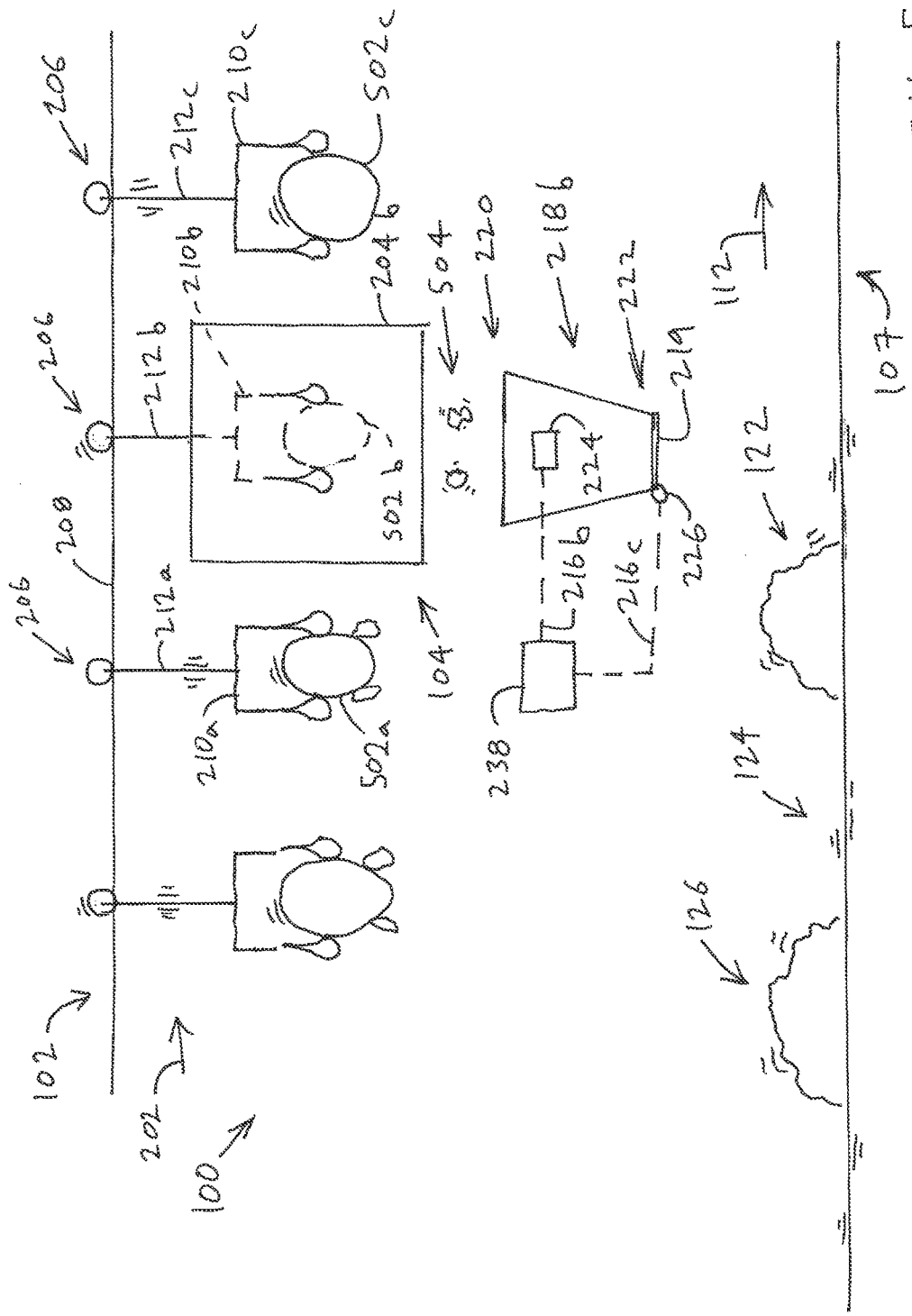
FIG. 5 is a diagram representing structures and functions of the conveyor system, cut-up stations, and hoppers embodying aspects of the disclosed subject matter.

Referring to FIG. 5, an embodiment of the conveyor system 102 is represented showing poultry carcasses suspended from the conveyor system 102, represented by poultry carcasses 502a, 502b, and 502c passing through cut-up station 204b. The conveyor system 102 includes trollies 206 that move along a track 208. The trollies 206 include wheels rotatably mounted to a frame for rolling along the track 208. A plurality of trollies 206 may be interconnected by connectors, and a motive force may be operably connected to the trollies 206 or connectors for advancing the carcasses through the processing system 100.

The poultry carcasses 502a, 502b, and 502c are suspended by their legs from shackles 210a, 210b, and 210c, respectively. Each shackle is connected to the trolley 206 and suspended below the track 208 by a suspension device 212a, 212b, and 212c. Suspension of the carcass from a shackle above the cut-up stations 104 allows the carcass to be manipulated and orientated by each cut-up station 104 for removal of a particular poultry part.

The hopper 106, represented by hopper 218b includes side walls defining an inlet 220 for receiving poultry parts 504 from the cut-up station 204b, and an outlet 222 for depositing the contents on the transportation conveyor 107. A movable portion of the hopper 218b retains the poultry parts 504 within the hopper 218b. An output device 408, represented by one or more actuators 226, is operably connected to a portion of the hopper 218b, such as a bottom wall, side wall, or doors 219 for moving the door 219. In an implementation, the actuator 226 is pneumatically powered, hydraulically powered, or electrically powered.

The poultry parts 504 are measured as they accumulate in the hopper 218b. The amount of poultry parts 504 within the hopper 218b are measured by an input device 406. In an implementation, the input device 406 is a measuring device 224. Other input devices 406 used with the system 100 include a level sensor to measure the level of the poultry parts in the hopper 218b, a proximity sensor to detect when the volume of poultry parts in the hopper 218b achieve a pre-determined level, and a product count mechanism that counts the number of poultry parts as they move from the cut-up station 104 to the hopper 218b. In an implementation, the product count mechanism includes a moment switch or a limit switch that is activated as the poultry parts pass by and engage the switch. In an implementation, the measuring device 224 is a weight sensor, such as a load cell, configured to provide weight data to the processor 402. Although load cells are described, the sensors used with the hopper 218b may include any conventional means of determining the contents of the hopper 218b, including photo recognition, and radar with poultry part counting and size algorithms. The measuring device 224 generates an output signal, represented by dashed line 216b. In the described implementations, the output signal 216b of the weight sensor is event data that represents the weight of the contents of the hopper 218b and the output signal 216b of the count mechanism is event data that represents one or more poultry parts. The signal 216b is transmitted to the data processing system 400, represented by the data processing system 238. The system 238 analyzes the signal along with other event data received from throughout the system 100.

Figure 6:
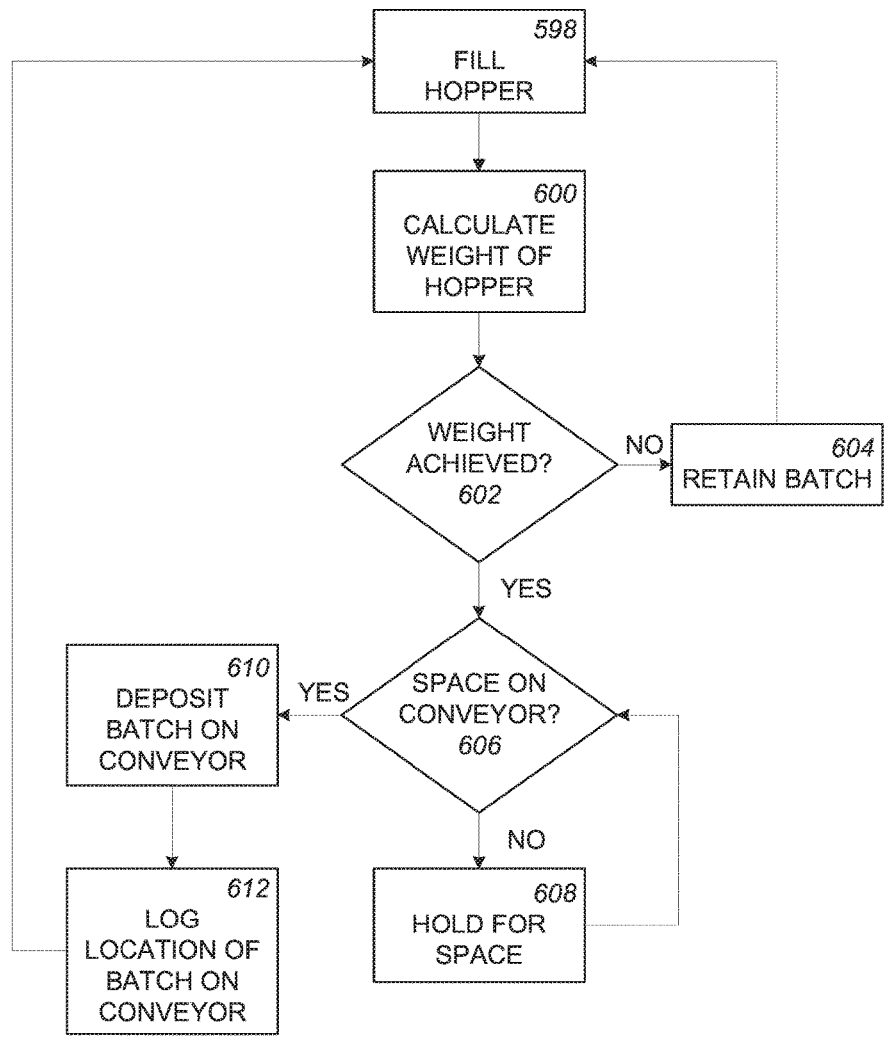
FIG. 6 is a flowchart diagramming an aspect of the steps of filling and emptying a hopper of the disclosed subject matter.

FIG. 6 is a flowchart of an exemplary poultry processing method including hopper 106, such as hopper 218b, comprising an aspect of the disclosed subject matter. As poultry parts 504 accumulate in the hopper 218b, the weight of the contents of the hopper 218b is detected by the weight sensor, and the weight is monitored by the data processing system 238. The poultry parts 504 fill the hopper at step 598 and accumulate in the hopper 218b until the weight reaches a predetermined threshold level wherein the system 238 determines a drop for the batch to deposit the poultry parts 504 on the transportation conveyor 107. At step 600 the data processing system 238 analyzes the weight of the hopper 218b. At step 602 the data processing system 238 calculates and measures the weight of the hopper 218b, and at step 602 compares the measured weight of the hopper 218b to the pre-determined threshold weight. If the measured weight has not reached the pre-determined weight, at step 604 the hopper 218b retains the batch. As poultry parts 504 further accumulate in the hopper 218b the data processing system 238 at step 600 reanalyzes the weight of the hopper 218b. The drop of a batch is determined by event data including characteristics of the poultry parts 504 in the hopper 218b, a backup in the processing of poultry parts downstream from the hopper 218b, and the availability of a space for the batch on the transportation conveyor 107. The data processing system 238 is configured to control movement of the transportation conveyor 107. When the measured weight has reached the pre-determined weight, at step 606 the data processing system 238 determines if there is space available on the conveyor 107. As the transportation conveyor 107 moves in the direction of arrow 112, it may have a first batch 122 of poultry parts upstream on the conveyor 107 moving toward the hopper 218b, followed by a first open space 124, and followed by a second batch 126. Poultry parts of different types can share the same conveyor 107. The system 238 tracks the location of each batch deposited on the conveyor 107 and the hopper 218 that deposited the batch allowing the system 238 to track the location of the open and occupied spaces on the conveyor 107. The system 238 tracks the location of these spaces or zones as they move through the steps of the processing system 238. The system 238 tracks and controls conveyor 107 speed, batch location, and batch spacing. The system 238 knows the location of the zones on the conveyor 107 allowing the system to avoid mixing of batches of dissimilar poultry parts, allowing the system to transport the batches of poultry parts on one conveyor to bins for further processing. If a space is not available on the conveyor 107, at step 608 the system 100 holds the batch in the hopper 218b, awaiting an open space on the conveyor 107. If a space is available on the conveyor 107, at step 610 the system 238 deposits the batch onto the conveyor 107. The system 238 sends an actuator output signal, represented by dashed line 216c, to the actuator 226 to release the contents of the hopper 218b on the conveyor 107. At step 612 the system 238 logs the location or zone of the batch on the conveyor 107 and the type of poultry parts and weight, the batch proceeds downstream for further processing, and the outlet 219 is sealed and the process of filling the hopper 218b begins again.

Figure 7:
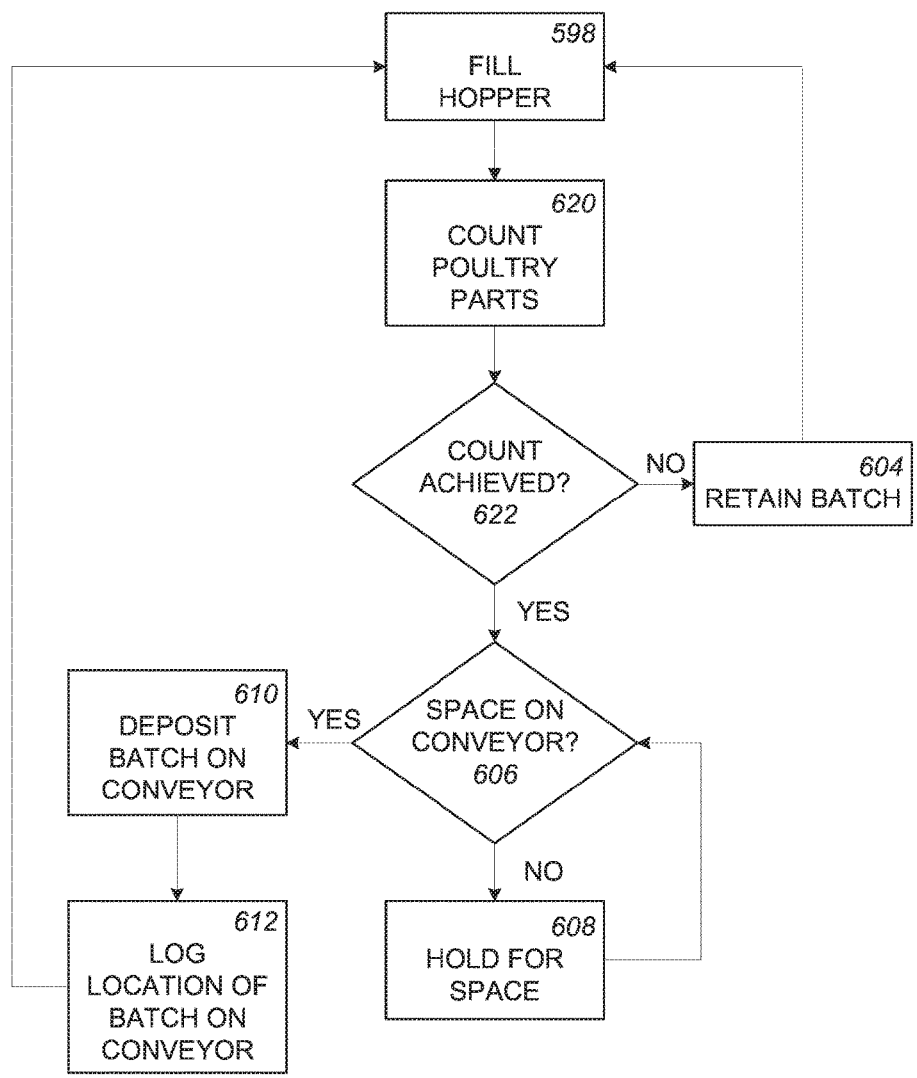
FIG. 7 is a flowchart diagramming an aspect of the steps of filling and emptying a hopper of the disclosed subject matter.

FIG. 7 is a flowchart of an exemplary poultry processing method including hopper 106, such as hopper 218b, comprising an aspect of the disclosed subject matter. As poultry parts 504 accumulate in the hopper 218b, the number of poultry parts 504 within the hopper 218b is counted by the a count mechanism, and the amount is monitored by the data processing system 238. The poultry parts 504 fill the hopper at step 598 and accumulate in the hopper 218b until the count reaches a predetermined threshold level wherein the system 238 determines a drop for the batch to deposit the poultry parts 504 on the transportation conveyor 107. At step 620 the data processing system 238 counts the number of poultry parts within the hopper 218b. At step 622 the data processing system 238 calculates the number of poultry parts within the hopper 218b, and at step 622 compares the count within the hopper 218b to the pre-determined threshold count. If the measured count has not reached the pre-determined count, at step 604 the hopper 218b retains the batch. As poultry parts 504 further accumulate in the hopper 218b the data processing system 238 at step 620 reanalyzes the count of the hopper 218b. The drop of a batch is determined by event data including characteristics of the poultry parts 504 in the hopper 218b, a backup in the processing of poultry parts downstream from the hopper 218b, and the availability of a space for the batch on the transportation conveyor 107. The data processing system 238 is configured to control movement of the transportation conveyor 107. When the measured count has reached the pre-determined count, at step 606 the data processing system 238 determines if there is space available on the conveyor 107. As the transportation conveyor 107 moves in the direction of arrow 112, it may have a first batch 122 of poultry parts upstream on the conveyor 107 moving toward the hopper 218b, followed by a first open space 124, and followed by a second batch 126. Poultry parts of different types can share the same conveyor 107. The system 238 tracks the location of each batch deposited on the conveyor 107 and the hopper 218 that deposited the batch allowing the system 238 to track the location of the open and occupied spaces on the conveyor 107. The system 238 tracks the location of these spaces or zones as they move through the steps of the processing system 238. The system 238 tracks and controls conveyor 107 speed, batch location, and batch spacing. The system 238 knows the location of the zones on the conveyor 107 allowing the system to avoid mixing of batches of dissimilar poultry parts, allowing the system to transport the batches of poultry parts on one conveyor to bins for further processing. If a space is not available on the conveyor 107, at step 608 the system 100 holds the batch in the hopper 218b, awaiting an open space on the conveyor 107. If a space is available on the conveyor 107, at step 610 the system 238 deposits the batch onto the conveyor 107. The system 238 sends an actuator output signal, represented by dashed line 216c, to the actuator 226 to release the contents of the hopper 218b on the conveyor 107. At step 612 the system 238 logs the location or zone of the batch on the conveyor 107 and the type of poultry pars and count, the batch proceeds downstream for further processing, and the outlet 219 is sealed and the process of filling the hopper 218b begins again.

In an embodiment of the disclosed subject matter, the processing system 100 includes a plurality of cut-up stations 104, and associated hoppers 106 beneath the cut-up stations 104 that drop batches of poultry parts onto a transportation conveyor 107 in a defined sequence. Referring to FIGS. 8-10, a first distribution line 152, second distribution line 164, and third distribution line 170 work in tandem to distribute batches of poultry parts onto a transportation conveyor 107. One or more conveyor systems 102 move poultry carcasses through the cut-up stations 104. Each cut-up station 104 removes a poultry part from the poultry carcass. Each station 104 has an associated hopper 106 gathering the poultry part removed by the associated cut-up station 104. Each hopper 106 gathers one of: mid joints 652, drumettes 654, whole wings 656, boneless thighs 658, breast caps 660, split breasts 662, breast fillets 664, tenders 666, leg quarters 668, anatomical legs 670, spatchcock 672, drums 674, 675, or bone in thighs 676.

Referring to FIG. 8, a plurality of cut-up stations 104 feed a plurality of hoppers 106 arranged along the first distribution line 152, the first distribution line 152 feeding batches to a transportation conveyor 107. The first distribution line 152 includes cut-up stations and hoppers for mid joints 652, drumettes 654, whole wings 666, boneless thighs 658, breast caps 660, and split breasts 662, fed by three conveyor systems 102.

In an implementation, the hoppers 106 of the first distribution line 152 deposit batches of poultry parts onto the transportation conveyor 107 in a first sequence. A first conveyor system 102a feeds hoppers for mid joints 652a, drumettes 654a, whole wings 656a, and boneless thighs 658a. A second conveyor system 102b feeds hoppers for mid joints 652b, drumettes 654b, boneless thighs 658b, and breast caps 660b. A third conveyor system 102c feeds hoppers for drumettes 654c, mid joints 652c, boneless things 658c, and split breasts 662c. The first sequence includes a first minute, followed by a second minute, followed by a third minute. The first minute includes eight sequential drops from different batches. The sequential drops are boneless thighs 658a, boneless thighs 658b, boneless thighs 658c, breast caps 660b, split breasts 662c, mid joints 652a, drumettes 654a, and whole wings 656a. The second minute includes seven drops from different batches. The sequential drops are boneless thighs 658a, boneless thighs 658b, boneless thighs 658c, breast caps 660b, split breasts 662c, mid joints 652b, and drumettes 654b. The third minute includes eight drops from different batches. The sequential drops are whole wings 656a, boneless thighs 658a, boneless thighs 658b, boneless thighs 658c, breast caps 660b, split breasts 662c, mid joints 652c, and drumettes 654c. Upon completion of the third minute, the system 100 returns to the first minute and cycles through again.

Referring to FIG. 9, a plurality of cut-up stations 104 feed a plurality of hoppers 106 arranged along the second distribution line 164, the second distribution line 164 feeding batches to the transportation conveyor 107. The second distribution line 164 includes cut-up stations and hoppers for breast fillets 664, tenders 666, leg quarter 668, anatomical legs 670, and spatchcock 672, fed by three conveyor systems 102.

In an implementation, the hoppers 106 of the second distribution line 164 deposit batches of poultry parts onto the transportation conveyor 107 in a first sequence. The first conveyor system 102a feeds hoppers for breast fillets 664a, tenders 666a, leg quarters 668a, and anatomical legs 670a. The second conveyor system 102b feeds hoppers for breast fillets 664b, tenders 666b, spatchcock 672b, and leg quarters 668b. The third conveyor system 102c feeds hoppers for breast fillets 664c, tenders 666c, and leg quarters 668c. The first sequence includes a first minute, followed by a second minute, followed by a third minute. The first minute includes nine sequential drops from different batches. The sequential drops are leg quarters 668a, anatomical legs 670a, breast fillets 664a, leg quarters 668b, spatchcock 672b, breast fillets 664b, leg quarters 668c, breast fillets 664c, and tenders 666a. The second minute includes nine drops from different batches. The sequential drops are leg quarters 668a, anatomical legs 670a, breast fillets 664a, leg quarters 668b, spatchcock 672b, breast fillets 664b, leg quarters 668c, breast fillets 664c, and tenders 666b. The third minute includes nine drops from different batches. The sequential drops are leg quarters 668a, anatomical legs 670a, breast fillets 664a, leg quarters 668b, spatchcock 672b, breast fillets 664b, leg quarters 668c, breast fillets 664c, and tenders 666b. Upon completion of the third minute, the system 100 returns to the first minute and cycles through again.

Referring to FIG. 10, a plurality of cut-up stations 104 feed a plurality of hoppers 106 arranged along the third distribution line 170, the third distribution line 170 feeding batches to the transportation conveyor 107. The third distribution line 170 includes cut-up stations and hoppers for first drums 674, second drums 675, and bone in thighs 676, fed by three conveyor systems 102.

In an implementation, the hoppers 106 of the third distribution line 170 deposit batches of poultry parts onto the transportation conveyor 107 in a first sequence. The first conveyor system 102a feeds hoppers for first drums 674a, second drums 675a, and bone in thighs 676a. The second conveyor system 102b feeds hoppers for first drums 674b, second drums 675b, and bone in thighs 676b. The third conveyor system 102c feeds hoppers for first drums 674b, second drums 675b, and bone in thighs 676b. The first sequence includes a first minute, followed by a second minute, followed by a third minute. The first minute includes nine sequential drops from different batches. The sequential drops are bone in thighs 676a, first drums 674a, second drums 675a, bone in thighs 676b, first drums 674b, second drums 675b, bone in thighs 676c, first drums 674c, and bone in thighs 675c. The second minute includes nine sequential drops from different batches. The sequential drops are bone in thighs 676a, first drums 674a, second drums 675a, bone in thighs 676b, first drums 674b, second drums 675b, bone in thighs 676c, first drums 674c, and bone in thighs 675c. The third minute includes nine sequential drops from different batches. The sequential drops are bone in thighs 676a, first drums 674a, second drums 675a, bone in thighs 676b, first drums 674b, second drums 675b, bone in thighs 676c, first drums 674c, and bone in thighs 675c. Upon completion of the third minute, the system 100 returns to the first minute and cycles through again.

The batches from the drops from the distribution lines 152, 164, and 170 travel to bulk container packaging processing 108 or to box container packaging processing 110 for further processing. In an embodiment, the system 100 transports the poultry parts to bulk containers 114 instead of bulk container packaging processing 108 or to box container packaging processing 110. Bulk containers 114 are then stored in refrigeration and the poultry parts are reintroduced to the transportation conveyor 107 as needed for transportation to bulk container packaging processing 108 or to box container packaging processing 110.

In an embodiment, the system 100 includes a yield measuring system that influences cut-up, batching, and distribution. In an embodiment, the system 100 includes a quality control system.

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure. For purposes of clarity in illustrating the characteristics of the present disclosed subject matter, proportional relationships of the elements have not been maintained in the figures. In some cases, the sizes of certain small components have been exaggerated for illustration.

Having described the disclosed subject matter, what is claimed as new and desired to be secured by Letters Patent is:

1. A poultry processing system, comprising:
   a first machine for removing poultry parts from a poultry carcass;
   a first hopper for receiving the poultry parts from the first machine;
   a conveyor for receiving poultry parts from the first hopper, the conveyor defining a first zone for receiving the poultry parts;
   a data processing system comprising a processor, a first input device, and a first output device;
   the first input device comprising a measuring device configured to measure the amount of poultry parts within the first hopper, and the measuring device configured to provide poultry part amount data to the processor;
   the first output device configured to deposit the poultry parts onto the conveyor; and wherein the data processing system is configured to control movement of the output device and conveyor, and the system deposits the poultry parts of the first hopper within the first zone upon the amount of the poultry parts within the first hopper achieving a threshold amount.

2. The poultry processing system of claim 1, further comprising:
wherein the first zone moves relative to the first hopper; and
wherein the data processing system tracks the location of the first zone.

3. The poultry processing system of claim 1, further comprising:
a first bulk container; and
wherein the first zone is moved to, and the poultry parts deposited in, the first bulk container.

4. The poultry processing system of claim 1, further comprising:
a first box container; and
wherein the first zone is moved to, and the poultry parts deposited in, the first box container.

5. The poultry processing system of claim 1, further comprising:
a bottom wall movable connected to the first hopper; and
wherein the first output device is an actuator operably connected to the bottom wall for moving the bottom wall to deposit poultry parts onto the conveyor.

6. The poultry processing system of claim 1, further comprising an overhead conveyor for delivering the poultry carcasses to the first machine.

7. The poultry processing system of claim 1, further comprising:
wherein the first input device is a weight sensor configured to detect the weight of the poultry parts within the first hopper, and the weight sensor configured to provide weight data to the processor; and
wherein the system deposits the poultry parts of the first hopper within the first zone upon the weight of the poultry parts within the first hopper achieving a threshold weight.

8. The poultry processing system of claim 1, further comprising:
wherein the first input device is a count mechanism configured to count the poultry parts within the first hopper, and the count mechanism configured to provide count data to the processor; and
wherein the system deposits the poultry parts of the first hopper within the first zone upon the count of the poultry parts within the first hopper achieving a threshold count.

9. A poultry processing method, comprising:
providing a plurality of machines for removing poultry parts from a poultry carcass;
providing a hopper for each machine, the hopper configured to receive the poultry parts from the machine;
providing a transportation conveyor for receiving poultry parts from the hoppers, the transportation conveyor defining a plurality of zones for receiving poultry parts;
providing a data processing system comprising a processor operably connected to a plurality of input devices and a plurality of output devices;
wherein the input devices include measuring devices configured to detect the amount of the poultry parts within each of the hoppers, the measuring devices configured to provide poultry part amount data to the processor;
wherein the output devices are configured to deposit the poultry parts from the hoppers in batches onto the transportation conveyor;
providing a poultry part threshold amount data; and
wherein the data processing system is configured to control the output device and transportation conveyor, and the system deposits the poultry parts within a zone on the transportation conveyor upon the amount of the poultry parts within a hopper achieving the threshold amount.

10. The poultry processing method of claim 9, further comprising:
wherein the plurality of machines include cut-up stations; and
wherein the plurality of hoppers include a mid joints hopper, a drumettes hopper, a whole wings hopper, a boneless thighs hopper, a breast caps hopper, a split breasts hopper, a breast fillets hopper, a tenders hopper, a leg quarters hopper, an anatomical legs hopper, a spatchcock hopper, a drums hopper, and a bone in thighs hopper.

11. The poultry processing method of claim 10, further comprising:
providing a first distribution line, comprising:
a first conveyor system conveying poultry carcasses to a cut-up station and hopper for mid joints, drumettes, whole wings, and boneless thighs;
a second conveyor system conveying poultry carcasses to a cut-up station and hopper for mid joints, drumettes, boneless thighs, and breast caps; and
a third conveyor system conveying poultry carcasses to a cut-up station and hopper for drumettes, mid joints, boneless things, and split breasts; and
wherein the poultry parts are deposited onto the transportation conveyor from the hoppers according to the sequence of first conveyor boneless thighs, second conveyor boneless thighs, third conveyor boneless thighs, second conveyor breast caps, third conveyor split breasts, first conveyor mid joints, first conveyor drumettes, first conveyor whole wings, first conveyor boneless thighs, second conveyor boneless thighs, third conveyor boneless thighs, second conveyor breast caps, third conveyor split breasts, second conveyor mid joints, second conveyor drumettes, first conveyer whole wings, first conveyor boneless thighs, second conveyor boneless thighs, third conveyor boneless thighs, second conveyor breast caps, third conveyor split breasts, third conveyor mid joints, and third conveyor drumettes.

12. The poultry processing method of claim 10, further comprising:
providing a second distribution line, comprising:
a first conveyor system conveying poultry carcasses to a cut-up station and hopper for breast fillets, tenders, leg quarters, and anatomical legs;
a second conveyor system conveying poultry carcasses to a cut-up station and hopper for breast fillets, tenders, spatchcock, and leg quarters; and
a third conveyor system conveying poultry carcasses to a cut-up station and hopper for breast fillets, tenders, and leg quarters; and
wherein the poultry parts are deposited onto the transportation conveyor from the hoppers according to the sequence of first conveyor leg quarters, first conveyor anatomical legs, first conveyor breast fillets, second conveyor leg quarters, second conveyor spatchcock, second conveyor breast fillets, third conveyor leg quarters, third conveyor breast fillets, first conveyor tenders, first conveyor leg quarters, first conveyor anatomical legs, first conveyor breast fillets, second conveyor leg quarters, second conveyor spatchcock, second conveyor breast fillets, third conveyor leg quarters, third conveyor breast fillets, second conveyor tenders, first conveyor leg quarters, first conveyor anatomical legs, first conveyor breast fillets, second conveyor leg quarters, second conveyor spatchcock, second conveyor breast fillets, third conveyor leg quarters, third conveyor breast fillets, and second conveyor tenders.

13. The poultry processing method of claim 10, further comprising:
    providing a third distribution line, comprising:
        a first conveyor system conveying poultry carcasses to a cut-up station and hopper for first drums, second drums, and bone in thighs;
        a second conveyor system conveying poultry carcasses to a cut-up station and hopper for first drums, second drums, and bone in thighs; and
        a third conveyor system conveying poultry carcasses to a cut-up station and hopper for first drums, second drums, and bone in thighs; and
    wherein the poultry parts are deposited onto the transportation conveyor from the hoppers according to the sequence of first conveyor first conveyor bone in thighs, first conveyor first conveyor first drums, first conveyor second drums, second conveyor bone in thighs, second conveyor first drums, second conveyor second drums, third conveyor bone in thighs, third conveyor first drums, third conveyor bone in thighs, first conveyor bone in thighs, first conveyor first drums, first conveyor second drums, second conveyor bone in thighs, second conveyor first drums, second conveyor second drums, third conveyor bone in thighs, third conveyor first drums, third conveyor bone in thighs, first conveyor bone in thighs, first conveyor first drums, first conveyor second drums, second conveyor bone in thighs, second conveyor first drums, second conveyor second drums, third conveyor bone in thighs, third conveyor first drums, and third conveyor bone in thighs.

14. The poultry processing method of claim 9, further comprising:
    wherein the measuring device is a weight sensor configured to detect the weight of the poultry parts within each of the hoppers, the weight sensor configured to provide weight data to the processor.

15. The poultry processing method of claim 9, further comprising:
    wherein the measuring device is a count mechanism configured to count the poultry parts within each of the hoppers, the count mechanism configured to provide count data to the processor.

* * * * *